United States Patent
Guan et al.

(10) Patent No.: US 11,470,771 B2
(45) Date of Patent: Oct. 18, 2022

(54) GROUND-CONTOUR-FOLLOWING AUTONOMOUS OBSTACLE AVOIDANCE MOWER FOR HILLSIDE ORCHARDS AND CONTROL METHOD THEREOF

(71) Applicant: Jiangsu University, Jiangsu (CN)

(72) Inventors: Xianping Guan, Jiangsu (CN); Zhipeng Liu, Jiangsu (CN); Fubin Dai, Jiangsu (CN); Baijing Qiu, Jiangsu (CN); Xiaoya Dong, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/421,023

(22) PCT Filed: Jun. 11, 2020

(86) PCT No.: PCT/CN2020/095584
§ 371 (c)(1),
(2) Date: Jul. 7, 2021

(87) PCT Pub. No.: WO2021/227171
PCT Pub. Date: Nov. 18, 2021

(65) Prior Publication Data
US 2022/0124974 A1   Apr. 28, 2022

(30) Foreign Application Priority Data
May 11, 2020   (CN) .......................... 202010390555.7

(51) Int. Cl.
*A01D 34/00*   (2006.01)
*A01D 34/78*   (2006.01)
(Continued)

(52) U.S. Cl.
CPC .......... *A01D 34/008* (2013.01); *A01D 34/662* (2013.01); *A01D 34/78* (2013.01);
(Continued)

(58) Field of Classification Search
CPC .... A01D 34/008; A01D 34/78; A01D 34/185; A01D 34/665; A01D 34/866;
(Continued)

(56) References Cited

U.S. PATENT DOCUMENTS 3,619,996 A * 11/1971 Jacobson et al. ...... A01B 63/00
56/13.6
4,129,186 A * 12/1978 Sheathelm ............. A01D 34/28
171/83
(Continued)

FOREIGN PATENT DOCUMENTS

| CN | 107229275 | 10/2017 |
| CN | 107743771 | 3/2018 |

(Continued)

OTHER PUBLICATIONS

"International Search Report (Form PCT/ISA/210) of PCT/CN2020/095584," dated Feb. 18, 2021, pp. 1-5.

*Primary Examiner* — Alicia Torres
(74) *Attorney, Agent, or Firm* — JCIP Global Inc.

(57) ABSTRACT

A ground-contour-following autonomous obstacle avoidance mower for hillside orchards and a control method thereof are provided to achieve multi-angle cutting and low energy consumption in mowing operation through cooperation of a push rod motor and a connecting-rod rotating pair. A connecting rod is arranged and forms a flexible mechanism together with an upper base bearing, a lower base bearing and a base-connecting unthreaded shaft. The flexible mechanism interacts with the push rod motor to achieve ground contour following operation, so that the mower as a whole can conduct ground-contour-following mowing operation on a complex orchard terrain, with a better cutting effect than that of a traditional mower.

20 Claims, 7 Drawing Sheets

(51) Int. Cl.
  *A01D 34/66* (2006.01)
  *A01D 34/86* (2006.01)
  *G05D 1/02* (2020.01)
  *B62D 55/116* (2006.01)
  *A01D 101/00* (2006.01)

(52) U.S. Cl.
  CPC .......... *A01D 34/866* (2013.01); *B62D 55/116* (2013.01); *G05D 1/0257* (2013.01); *A01D 2101/00* (2013.01); *G05D 2201/0208* (2013.01)

(58) Field of Classification Search
  CPC .............. A01D 2101/00; A01D 67/005; A01D 34/662; G05D 1/0257; G05D 2201/0208; B62D 55/116
  See application file for complete search history.

(56) References Cited

U.S. PATENT DOCUMENTS

| | | |
|---|---|---|
| 5,966,912 A | 10/1999 | Swisher et al. |
| 2017/0280621 A1 | 10/2017 | Kawai et al. |

FOREIGN PATENT DOCUMENTS

| | | | |
|---|---|---|---|
| CN | 207284231 | 5/2018 | |
| CN | 109348831 | 2/2019 | |
| CN | 109362331 | 2/2019 | |
| CN | 209563198 | 11/2019 | |
| FI | 119584 B1 * | 1/2009 | ............. A01D 34/54 |

* cited by examiner

GROUND-CONTOUR-FOLLOWING AUTONOMOUS OBSTACLE AVOIDANCE MOWER FOR HILLSIDE ORCHARDS AND CONTROL METHOD THEREOF

CROSS-REFERENCE TO RELATED APPLICATION

This application is a 371 of international application of PCT application serial no. PCT/CN2020/095584, filed on Jun. 11, 2020, which claims the priority benefit of China application no. 202010390555.7, filed on May 11, 2020. The entirety of each of the above mentioned patent applications is hereby incorporated by reference herein and made a part of this specification.

TECHNICAL FIELD

The present invention relates to the technical field of agricultural machinery, and specifically to a ground-contour-following autonomous obstacle avoidance mower for hillside orchards and a control method thereof.

BACKGROUND

As the terrain of hillside orchards is complex, most of conventional mowing methods require personnel to perform mowing operation by using hand-held machines or by hands, which has a low degree of intelligence and cannot achieve accurate mowing. The conventional mowing methods rely heavily on personnel, and since the kinetic energy of mowing machinery is relatively high, a certain threat is posed to the life safety of operators. In addition, when used in potholes, conventional mowers cannot provide a good mowing effect, and the ground contour following effect is not good. The energy consumption of mowing is rather high, leading to an unnecessary waste of energy.

SUMMARY

To overcome the drawbacks in the prior art, the present invention provides a ground-contour-following autonomous obstacle avoidance mower for hillside orchards and a control method thereof. The mower of the present invention has the advantages of even cutting and being efficient, energy saving and environmentally friendly, high in safety and intelligent.

The above technical object of the present invention is attained with the following technical means.

A ground-contour-following autonomous obstacle avoidance mower for hillside orchards, including a mechanical section and a control system, wherein the mechanical section includes a header and a tracked chassis, a winch support and a control box are arranged on a chassis body of the tracked chassis, a push-rod-motor rear connecting base in front of the winch support is connected to a rear end of a push rod motor, an electric winch is mounted in the middle of the winch support, and a two-dimensional laser radar is mounted at a top end of the winch support; a navigation system is further arranged on the chassis body of the tracked chassis; the header includes buffer depth-limiting mechanisms, a front depth-limiting-mechanism connecting plate, a motor connecting plate, a header supporting plate and a rear depth-limiting-mechanism connecting plate, a front end of the front depth-limiting-mechanism connecting plate is connected to three buffer depth-limiting mechanisms, support frames are arranged on the front end of the front depth-limiting-mechanism connecting plate at positions not connected to the buffer depth-limiting mechanisms, a rear end of the front depth-limiting-mechanism connecting plate is sequentially connected to the motor connecting plate and the rear depth-limiting-mechanism connecting plate, an upper side of the motor connecting plate is connected to the header supporting plate, and an edge of a rear end of the rear depth-limiting-wheel-mechanism connecting plate is connected to two buffer depth-limiting mechanisms;

the buffer depth-limiting mechanism includes a mounting base, a buffer spring, a rotating pair connecting rod and a universal depth-limiting wheel, a lower side of the mounting base is connected to the front depth-limiting-mechanism connecting plate and the rear depth-limiting-mechanism connecting plate, two ends of the buffer spring are respectively connected to the rotating pair connecting rod and the mounting base, the rotating pair connecting rod is in the shape of a letter "J", a lower end of the rotating pair connecting rod is connected to the mounting base, and an outer side of the rotating pair connecting rod is connected to the universal depth-limiting wheel by a universal depth-limiting-wheel connecting bracket;

the control system includes a drive system and a detection main control system, the drive system is configured to drive the tracked chassis to operate, the detection main control system includes the two-dimensional laser radar, the navigation system, a radar-associated attitude sensor, a barometer, a 4G communication system, and an upper industrial computer, the two-dimensional laser radar, the navigation system, the radar-associated attitude sensor, and the barometer all communicate with the upper industrial computer, the barometer and the radar-associated attitude sensor are mounted inside the two-dimensional laser radar, and the 4G communication system is configured to enable communication between the upper industrial computer and a cloud server; and the upper industrial computer further performs signal transmission with a chassis lower computer and a header lower computer.

In the above technical solution, cutters are respectively mounted on two cutter drive motors on the motor connecting plate, and a header acceleration attitude sensor is further mounted on the motor connecting plate, to feed back a cutter angle in real time.

In the above technical solution, an upper part of the header supporting plate is connected to a base bearing connecting plate, a lower base bearing is mounted on the base bearing connecting plate, and the lower base bearing is connected to the upper base bearing by a base-connecting unthreaded shaft, to form a rotating pair; and a push-rod-motor front connecting base is arranged at a rear end of the base bearing connecting plate, and is configured to be connected to an extension end of the push rod motor.

In the above technical solution, the upper base bearing is mounted at a lower end of an upper connecting plate, a winch rope connecting base is arranged at a rear end of the upper connecting plate and is configured to be connected to a rope hook of the electric winch, a connecting-rod connecting base is mounted on the upper connecting plate, the connecting-rod connecting base is fixedly connected to a front end of a connecting rod, a rear end of the connecting rod is connected to a connecting-rod rotating pair.

In the above technical solution, the drive system includes a servo motor, an encoder, a reducer, a chassis power supply and the chassis lower computer, an output shaft of a servo motor is connected to an input bearing of the reducer, the encoder is mounted inside the servo motor, and the chassis lower computer is in signal connection with the servo motor and the encoder.

A method for controlling the ground-contour-following autonomous obstacle avoidance mower for hillside orchards, including tracked chassis detection and control, header detection and control, path planning and operation planning, wherein specifically, calibration of an advancing direction of the tracked chassis is realized by combining heading direction information from the navigation system with data from the radar-associated attitude sensor and the encoder inside the servo motor, the encoder measures rotating speeds of tracks on two sides in real time, and if the rotating speeds of the tracks on the two sides both reach a predetermined rotating speed range, the radar-associated attitude sensor starts to use a yaw angle to check the advancing direction of the tracked chassis; if yaw angle detection indicates that the yaw angle remains unchanged during advancing of the tracked chassis, the navigation system is used to re-measure whether there is a problem with a heading direction;

the header lower computer compares a current overall roll angle of the header with a preset angle value for the header, if the current overall roll angle of the header does not fall within a range of the preset angle value for the header, the header lower computer drives the push rod motor to telescope until the current overall roll angle of the header falls within a required deviation range relative to the preset angle value, so as to change a cutting angle, and at the same time, the header lower computer controls a cutter rotating angle and a height of the header;

according to a road sign in an ambient environment, the two-dimensional laser radar is adjusted to a suitable height, and the upper industrial computer determines information about the ambient environment by querying point cloud map information of a location of the two-dimensional laser radar corresponding to the suitable height, starts to perform path planning for the ambient environment, determine edge lines, define primary and secondary edge lines, and plan path blocks; an advancing speed of the tracked chassis and a cutting speed and an optimal cutting angle of the cutter are set based on terrain; and the mower performs mowing operation, and if there is an obstacle ahead at a position at a safety distance Ls, starts to perform right-angle obstacle avoidance, or if there is no obstacle and there is a border ahead at a position at the safety distance Ls, stops operation or performs row change operation based on a type of the border.

Further, the right-angle obstacle avoidance is specifically: if there is an obstacle ahead, turning at a position that is distant from the obstacle by Ls, and advancing by Ls after turning 90° toward a secondary edge line; if at this time the advancing path before the turning is already far away from the obstacle, turning, by the mower, 90° toward a primary edge line; or if at this time the advancing path before the turning is not far away from the obstacle, continuing to advance by Ls until the advancing path before the turning is far away from the obstacle, at which time the mower turns 90° toward a primary edge line, advances by Ls and then turns 90°, to return to the advancing path before the turning, wherein Ls is the safety distance.

Further, a process of determination based on the type of the border is as follows:

comparing, by an upper main control computer, a number of path blocks that the mower has passed through with a previously planned number of path blocks; and if the number of path blocks that the mower has passed through is less than the previously planned total number of path blocks, determining that the border ahead is a row change border, so that when reaching a position distant from the border by Ls, the mower turns 90° toward a right edge line, advances by L after the turning, and then turns 90° toward a left edge line, and advances to continue with the mowing operation; or if the number of path blocks that the mower has passed through is greater than or equal to the previously planned total number of path blocks, determining that the border ahead is an endpoint border, so that when reaching the endpoint border, the mower stops operation.

The present invention has the following beneficial effects.

(1) The buffer depth-limiting mechanism of the mower of the present invention indirectly compresses the buffer spring by means of the universal depth-limiting wheel, so that when the header impacts on the ground, the buffer spring can fully absorb the impact energy, thereby achieving depth limiting to protect the header and at the same time protect the internal parts of the header from damage.

(2) The mower of the present invention uses two motors to respectively drive the two cutters to rotate, so that when one of the motors breaks down, only the effect of operation is affected, but the operation will not be stopped.

(3) In the mower of the present invention, the support frames are arranged on the front end of the front depth-limiting-mechanism connecting plate at the positions not connected to the buffer depth-limiting mechanisms, to prop up the plants, so that the theoretical minimum rotating speed required by cutting is reduced, thereby reducing the loss of cutting energy and improving the cutting quality.

(4) Through the cooperation of the push rod motor and the rotating pair, the header of the mower of the present invention allows for appropriate angle adjustment to achieve an optimal cutting angle, thereby obtaining an optimal cutting effect.

(5) The measurement reference of the header acceleration attitude sensor of the mower of the present invention is the horizontal plane. Because the overall growth direction of plants is perpendicular to the horizontal plane due to heliotropism, the reference plane of plant growth is consistent with the measurement reference of the sensor. Therefore, for the operation of cutting weeds on slopes, the cutting angle of the cutter relative to the weeds is not affected by the inclination angle of the slope. Therefore, the header can also perform accurate multi-angle cutting operations in a slope environment with a certain angle.

(6) In the mower of the present invention, the connecting rod is arranged, the connecting rod forms the flexible mechanism together with the upper base bearing, the lower base bearing and the base-connecting unthreaded shaft, and the flexible mechanism interacts with the push rod motor, so that the mower can conduct ground-contour-following mowing operation on a complex orchard terrain, with a better cutting effect than that of a traditional mower.

(7) The control method of the present invention adopts two-level control, where the header and the chassis are controlled separately and do not interfere with each other. Such a modular design makes it more convenient for maintenance and upgrading. Using the encoder, the navigation system and the radar-associated attitude sensor in combination ensures the accuracy of the heading direction and location to the greatest extent, and using the point cloud map in combination with real-time information of the two-dimensional laser radar ensures the accuracy of the current location and the precise positioning of obstacles.

(8) The control method of the present invention adopts the upper industrial computer and the chassis lower computer to cause the mower to adopt the right-angle bypassing obstacle avoidance mode. This is simple, and can ensure the safety and operational reliability of the mower to the greatest extent while reducing the occupation of the computing space of the upper industrial computer.

Figure 1:
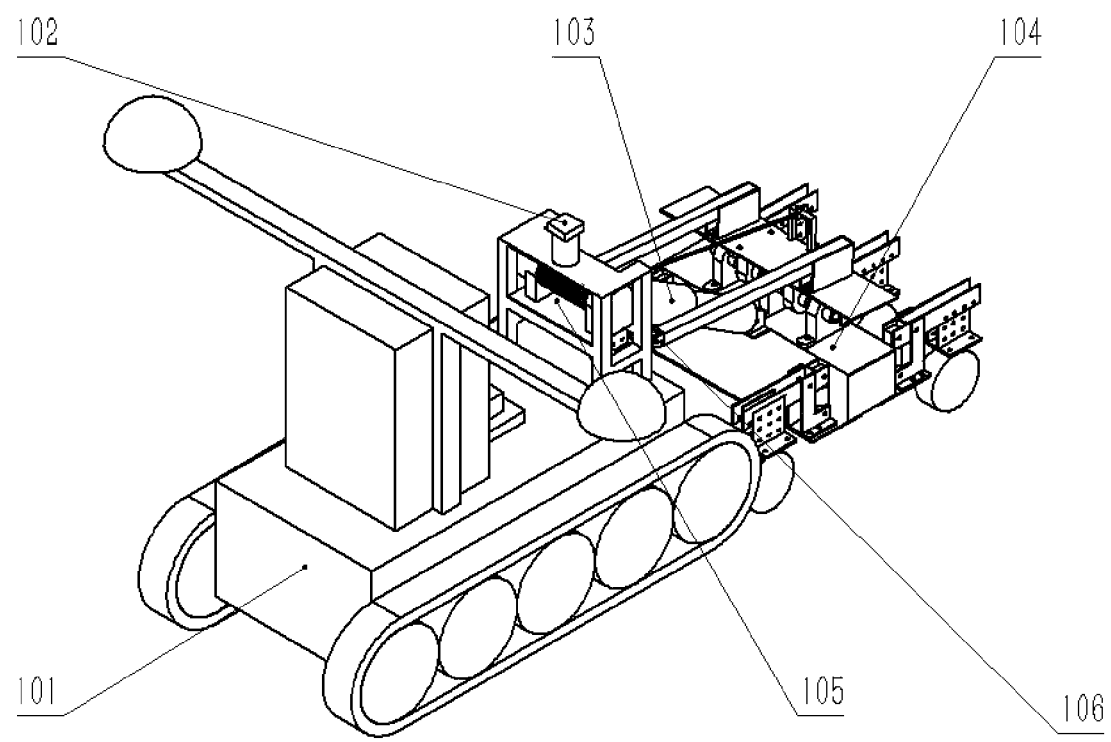
FIG. 1 is a schematic structural view of a ground-contour-following autonomous obstacle avoidance mower for hillside orchards according to the present invention.

In the drawings: 101—tracked chassis; 102—two-dimensional laser radar; 103—push rod motor; 104—header; 105—electric winch; 106—connecting-rod rotating pair; 201—buffer depth-limiting mechanism; 202—front depth-limiting-mechanism connecting plate; 203—motor connecting plate; 204—header supporting plate; 205—rear depth-limiting-mechanism connecting plate; 301—lower base bearing; 302—base bearing connecting plate; 303—push-rod-motor front connecting base; 304—base-connecting unthreaded shaft; 401—connecting rod; 403—upper base bearing; 404—upper connecting plate; 405—connecting-rod connecting base; 406—winch rope connecting base; 501—main radar antenna; 502—positioning radar rack; 503—secondary radar antenna; 504—control box; 506—winch support; 507—push-rod-motor rear connecting base; 601—mounting base; 602—buffer spring; 603—rotating pair connecting rod; 604—universal depth-limiting wheel.

DETAILED DESCRIPTION OF THE EMBODIMENTS

Although the mode of practicing the present invention can be easily transformed to other implementations, the present invention describes a specific implementation. It should be understood that the present invention discloses an example for showing the working principle, and the present invention is not intended to be limited to the special example shown.

As shown in FIG. 1, a ground-contour-following autonomous obstacle avoidance mower for hillside orchards includes a mechanical section and a control system. The mechanical section includes a header 104 and a tracked chassis 101.

Figure 2:
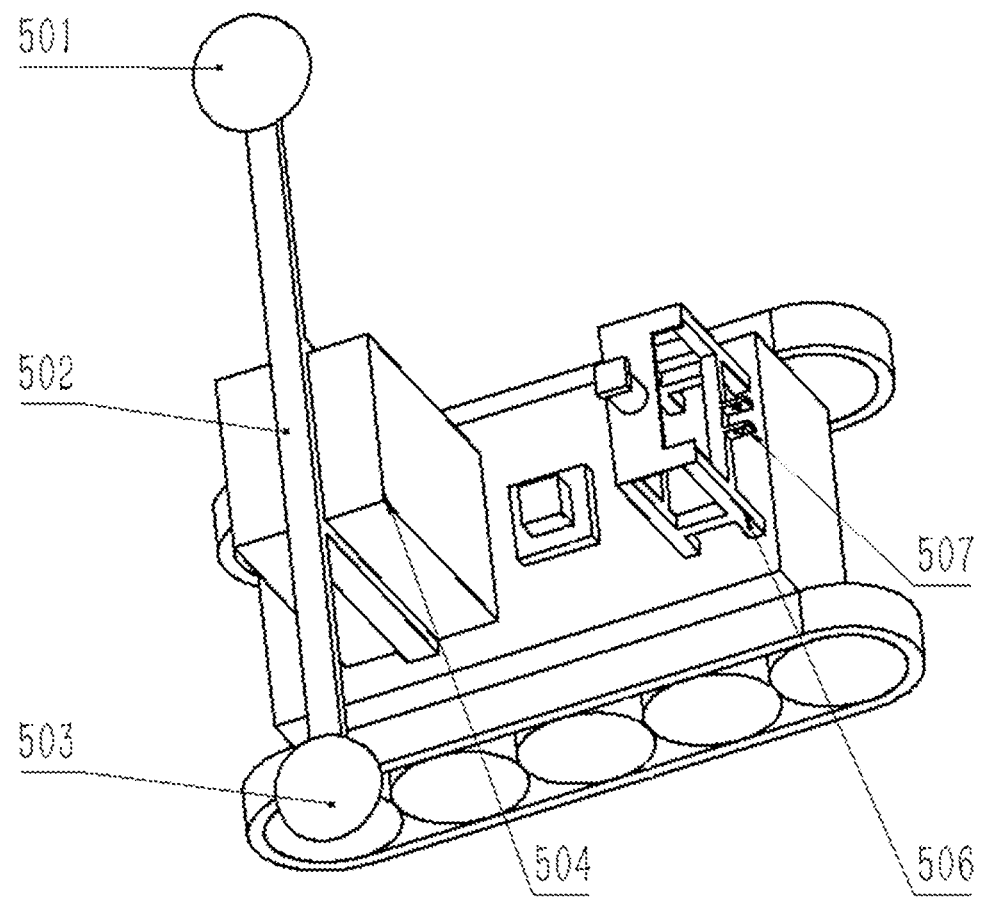
FIG. 2 is a schematic structural view of a tracked chassis according to the present invention.

As shown in FIG. 2, the tracked chassis 101 includes a chassis body. A winch support 506 and a control box 504 are sequentially arranged on the chassis body along an advancing direction of the mower. The winch support 506 is welded to the chassis body. A longitudinal axis of the control box 504 coincides with a longitudinal axis of a surface of the tracked chassis 101. The control box 504 is mounted at about a ¾ position in the longitudinal direction behind a transverse axis of the surface of the tracked chassis 101 by a bolt. The control box 504 is configured for storing a header lower computer and a chassis lower computer. A push-rod-motor rear connecting base 507 is welded in front of the winch support 506, and is configured to be connected to a mounting hole at a rear end of the push rod motor 103 by a round pin. In this way, the angle of the header can be conveniently changed during the telescoping process of the push rod motor 103. In addition, when the angle of the header is kept unchanged, the cutting angle can remain unchanged as the header moves up and down. A middle portion of the winch support 506 is configured for mounting an electric winch 105. A two-dimensional laser radar 102 is mounted at a top end of the winch support 506. Preferably, in this embodiment, unthreaded holes are provided on two sides of the control box 504, for being connected to a positioning radar rack 502. The radar rack 502 includes a chassis connection bracket and a heading-direction bracket. Unthreaded holes are provided on a lower end and two inner sides of the chassis connection bracket, for being aligned with threaded holes on the tracked chassis 101 and the unthreaded holes on the two sides of the control box 504, followed by fixing with threaded or bolt-nut connection. The heading-direction bracket is configured for mounting a main radar antenna 501 and a secondary radar antenna 503. The heading-direction bracket needs to be so long that accurate heading direction information can be obtained from a center distance between the main radar antenna 501 and the secondary radar antenna 503.

A track grounding length of the chassis body and a track width satisfy the following relational expression:

$$G/(2*Sk*Lj) < Pa*Kpa$$

where G is the overall weight of the chassis body (N), Sk is the track width (m), Lj is the track grounding length (m), Pa is the maximum withstand pressure of soil in the operating environment (pa), and Kpa is a safety factor (<1).

The track of the tracked chassis 101 is made of rubber.

To ensure the turning performance of the chassis body, a ratio of the track grounding length Lj to a roll clearance B should be between 1-1.7, with a ground pressure being less than 50 kpa.

The chassis body adopts independent suspension. The suspension mode is that adjustable dampers are mounted above load wheels on the left and right sides, so as to achieve the suspension function.

Figure 3:
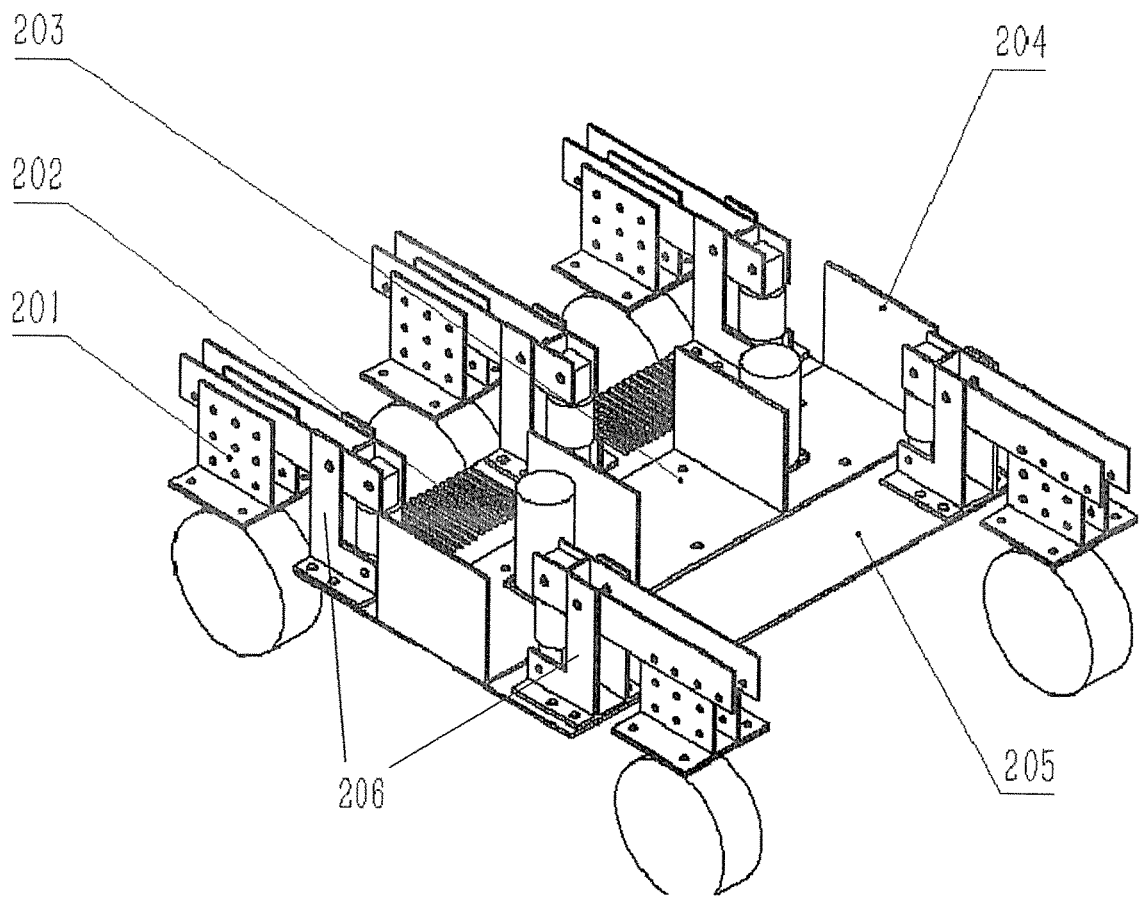
FIG. 3 is a schematic structural view of a header according to the present invention.

As shown in FIG. 3, the header 104 includes buffer depth-limiting mechanisms 201, a front depth-limiting-mechanism connecting plate 202, a motor connecting plate 203, a header supporting plate 204 and a rear depth-limiting-mechanism connecting plate 205. Unthreaded holes are provided on two sides and a middle portion of an edge of a front end of the front depth-limiting-mechanism connecting plate 202, for being connected to three buffer depth-limiting mechanisms 201 in front. Support frames 206 are arranged on the front end of the front depth-limiting-mechanism connecting plate 202 at positions not connected to the buffer depth-limiting mechanisms 201. A spacing between the support frames 206 needs to be so large that when the mower advances at a speed of 2 m/s, weeds do not fill up the spacing between the support frames 206 to cause a locked-rotor phenomenon of the cutter. The front depth-limiting-mechanism connecting plate 202 needs to be so long in the longitudinal direction that the cutter will not be exposed during rotation to cause operational hazards. Unthreaded holes are provided on a rear end of the front depth-limiting-mechanism connecting plate 202, and are connected to unthreaded holes on a front end of the motor connecting plate 203 by bolts and nuts. Unthreaded holes are provided on a rear end of the motor connecting plate 203, and are connected to unthreaded holes on a front end of the rear depth-limiting-mechanism connecting plate 205 by bolts and nuts. Unthreaded holes are provided at two side edges, a ¾ position, and a ¼ position of the motor connecting plate 203 in the transverse direction, for being connected to the header supporting plate 204. An upper surface and a lower surface of the header supporting plate 204 are both provided with threaded holes for respectively being connected to a base bearing connecting plate 302 and the motor connecting plate 203 by bolts. The number of the threaded holes is not less than 3, and the threaded holes are arranged at equal intervals. The header supporting plate 204 is made of a material with high strength, such as 306 stainless steel. Unthreaded holes are provided on two sides of an edge of a rear end of the rear depth-limiting-wheel-mechanism connecting plate 205, for being connected to two buffer depth-limiting mechanisms 201 in the rear. The two buffer depth-limiting mechanisms 201 are respectively mounted at edges of corners on the two sides by the rear depth-limiting-mechanism connecting plate 205.

A header acceleration attitude sensor is mounted on an upper surface of the motor connecting plate 203, to feed back a cutter angle in real time, so that the entire header 104 can monitor and adjust the cutting angle in real time. Two cutter drive motors are mounted on the motor connecting plate 203. The cutter drive motors are located on a longitudinal center line of the motor connecting plate 203. A cutter is connected to an output shaft of each of the cutter drive motors by a cutter connection means (prior art). A transverse spacing between the two cutter drive motors needs to be at least 1 mm greater than a diameter of the cutter, so as to prevent the two cutters from colliding with each other during rotation to cause damage to the cutters. A brushless motor is used as the cutter drive motor. The brushless motor adopts a trapezoid acceleration/deceleration and proportional-integral-derivative (PID) control algorithm.

A formula for calculating the torque of the cutter drive motor is:

$$M=9550*P/N$$

where M is the motor torque, P is the motor power, and N is the motor speed.

For selection of the cutter drive motor, a driver for use with the motor needs to be able to monitor and control the rotating speed of the motor in real time and support emergency braking (prior art).

The cutter specification is selected according to the following formula:

$$Va \leq 2\pi nr/60000$$

where Va is the lateral linear velocity of the cutter (m/s), n is the rotating speed of the cutter, and r is the radius of the cutter. For a mowing speed range of 30 m/s-80 m/s, Va=40 m/s and the rotating speed n=3000 r/min, a minimum radius of 127 mm of the cutting edge of the cutter can be obtained through calculation. In order to ensure the cutting effect, the radius of the cutter is set to 130 mm in this embodiment. In order to ensure the optimal cutting effect, the overall length of the cutter is set to 310 mm, a part from a 130 mm position of the cutter radius to a 155 mm position of the cutter radius is configured as the cutting edge, and the angle of the cutting edge is 30°.

Figure 4:
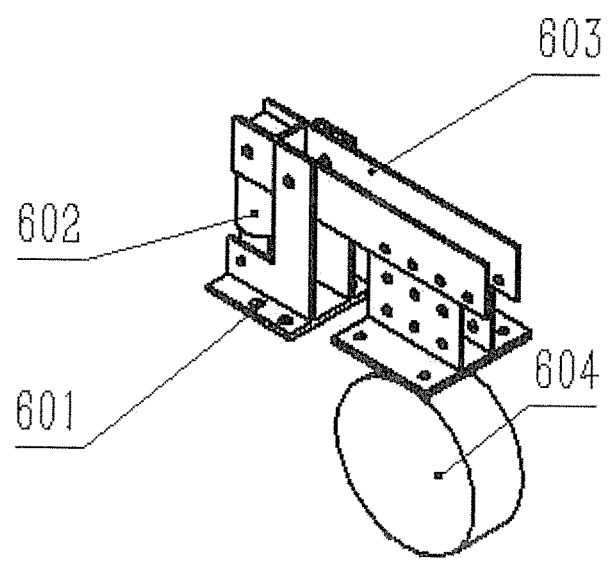
FIG. 4 is a schematic structural view of a buffer depth-limiting mechanism according to the present invention.

As shown in FIG. 4, the buffer depth-limiting mechanism 201 includes a mounting base 601, a buffer spring 602, a rotating pair connecting rod 603, a universal depth-limiting-wheel connecting bracket and a universal depth-limiting wheel 604. The rotating pair connecting rod 603 is in the shape of a letter "J". Unthreaded holes are provided on the lower side of the mounting base 601. The mounting base 601 is connected to the front depth-limiting-mechanism connecting plate 202 and the rear depth-limiting-mechanism connecting plate 205 by bolts and nuts. Unthreaded mounting holes are provided on two ends of the buffer spring 602. A lower end of the buffer spring 602 is connected to the mounting base 601 by bolts and nuts, and an upper end of the buffer spring 602 is connected to the rotating pair connecting rod 603. Unthreaded holes are provided on both an upper end and a lower end of an inner side of the rotating pair connecting rod 603, and the rotating pair connecting rod 603 is respectively connected to the buffer spring 602 and the mounting base 601 by unthreaded shafts. A plurality of unthreaded holes is arranged at equal intervals on an outer side of the rotating pair connecting rod 603, for being connected to the universal depth-limiting-wheel connecting bracket. The universal depth-limiting-wheel connecting bracket is configured for mounting the universal depth-limiting wheel 604, and the number of unthreaded holes on the outer side of the rotating pair connecting rod 603 is greater than the number of unthreaded holes on the universal depth-limiting-wheel connecting bracket by 1-3, so that the positions of the universal depth-limiting wheel 604 and the cutters can be conveniently adjusted, to prevent the cutters from coming into contact with the universal depth-limiting wheel 604 to cause damage to the parts.

The motor connecting plate 203 is connected to the front depth-limiting-mechanism connecting plate 202 and the rear depth-limiting-mechanism connecting plate 205, and thus is rigidly connected to five buffer depth-limiting mechanisms 201. When the header 104 suddenly drops during the advancing process or the lifting process, the rotating pair connecting rod 603 rotates to drive the expansion or contraction of the buffer spring 602 to eliminate the impact energy, so as to reduce the damage caused by the impact force or inertial force to the entire header.

Figure 5:
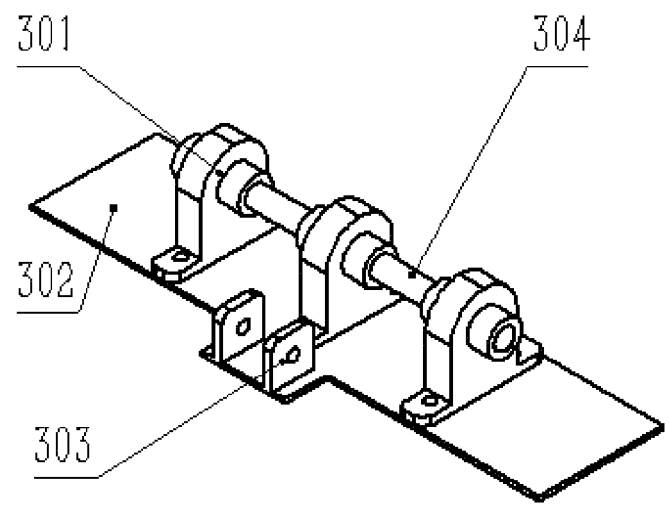
FIG. 5 is a schematic assembled view of an upper base bearing according to the present invention.

As shown in FIG. 5, three lower base bearings 301 are mounted on an upper surface of the base bearing connecting plate 302, where one of the lower base bearings 301 is mounted at a middle position on the base bearing connecting plate 302, and the other two are mounted symmetrically about a transverse center line of the base bearing connecting plate 204. A mounting spacing needs to be greater than the width of one upper base bearing 403, so as to facilitate the connection with the upper base bearing 403. A push-rod-motor front connecting base 303 is welded to a rear end of the base bearing connecting plate 302. The push-rod-motor front connecting base 303 is connected to an extension end of the push rod motor 103. The connection method is as follows: Connecting holes on the push rod motor 103 and the push-rod-motor front connecting base 303 are aligned with each other and connected by round pins, to ensure that the push rod motor 103 and the push-rod-motor front connecting base 303 do not interfere with each other during telescoping of the push rod motor 103. The push rod motor 103 is driven by a stepping motor, and the stepping motor adopts a trapezoid acceleration/deceleration control algorithm. The push rod motor 103 pushes and pulls the base bearing connecting plate 302 through telescoping, so as to adjust the angle of the cutting part of the header 104. The lower base bearings 301 are connected to the upper base bearings 403 by a base-connecting unthreaded shaft 304, to form a rotating pair.

Figure 6:
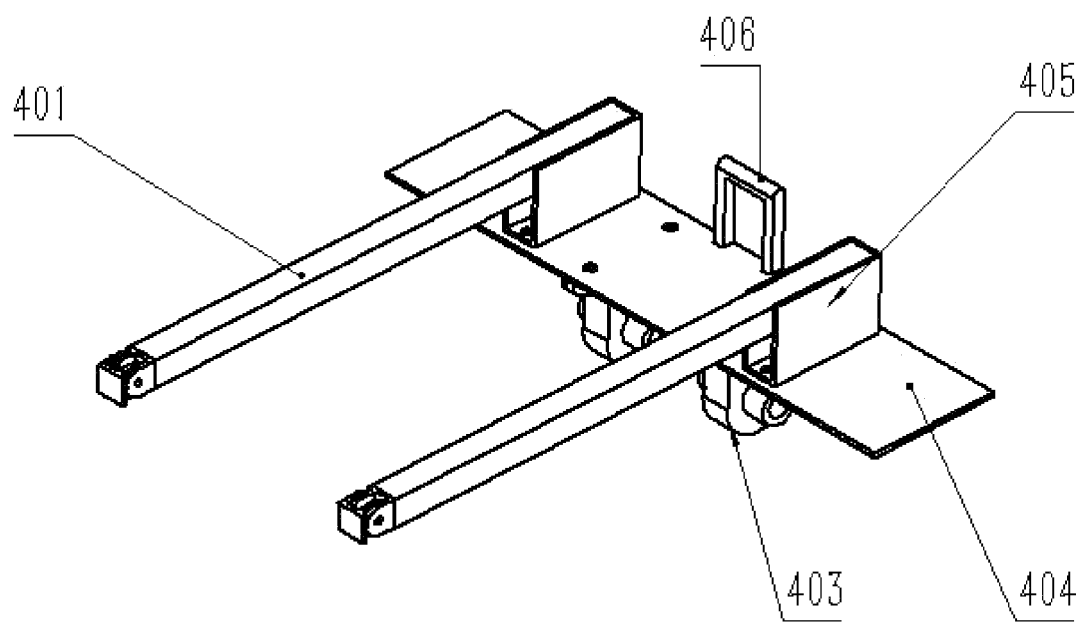
FIG. 6 is a schematic assembled view of a lower base bearing according to the present invention.
Figure 7:
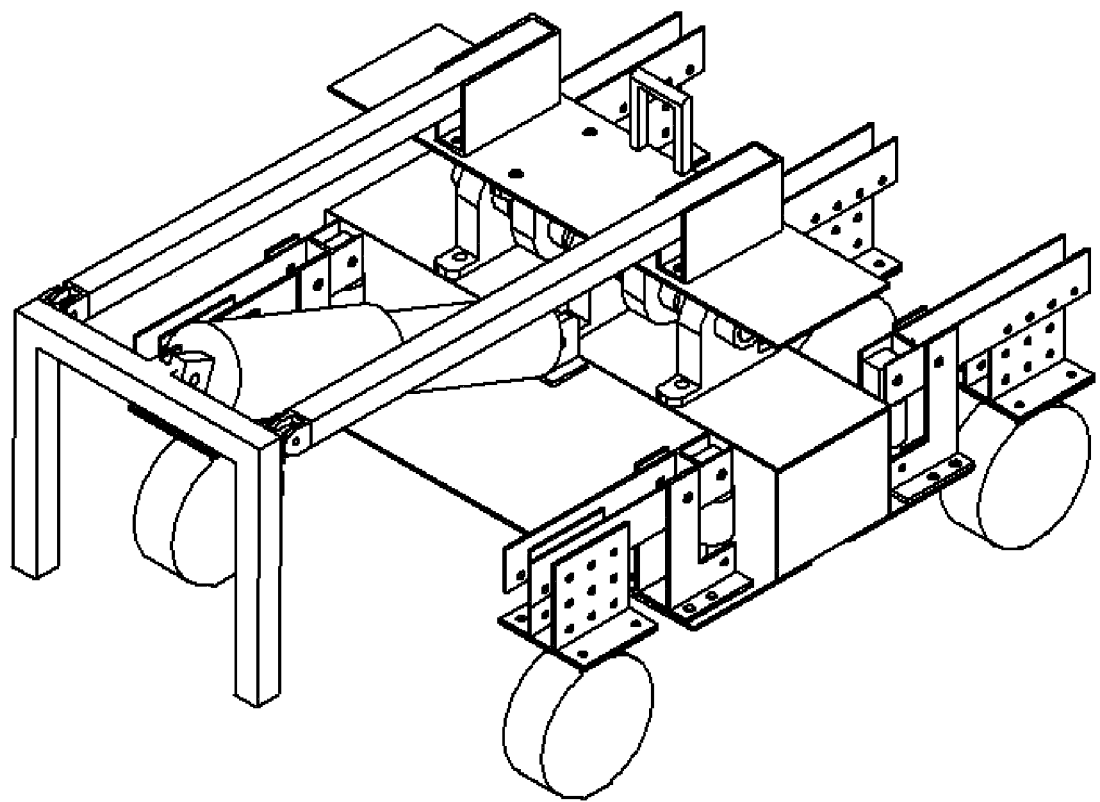
FIG. 7 is a schematic assembled view of a connecting rod according to the present invention.

As shown in FIG. 6, the upper base bearing 403 is mounted at a lower end of an upper connecting plate 404. Specifically, the upper connecting plate 404 is provided with unthreaded holes in the longitudinal direction at intervals of a sum of the width of the lower base bearing 301 and 1 cm and by using the transverse center line as an axis of symmetry, for mounting the upper base bearings 403. A winch rope connecting base 406 is welded to an edge of a rear end of the upper connecting plate 404. The winch rope connecting base 406 is connected to a rope hook of the electric winch 105. When the electric winch 105 rotates reversely to take up a rope, the winch rope connecting base 406 is pulled up by the hook, so that the header 104 is hoisted as a whole. By using a transverse axis of the upper connecting plate 404 as an axis of symmetry and using the width of the tracked chassis 101 as a reference, an unthreaded mounting hole is provided, for mounting a connecting-rod connecting base 405. An unthreaded hole is provided on an upper end of the connecting-rod connecting base 405, for being fixedly connected to a front end of a connecting rod 401. Unthreaded holes are provided on a rear end of the connecting rod 401, for being connected to a connecting-rod rotating pair 106 by bolts, so that the header 104 is connected to the tracked chassis 101 by the connecting rod, as shown in FIG. 7.

The electric winch 105 is powered by the chassis body. The electric winch 105 is driven by a winch driver. The winch driver controls operation of the electric winch 105 by receiving an input signal from the header lower computer. The output torque of the electric winch 105 satisfies the following formula:

$$Mj=Kj*Gg*Lg$$

where Mj is the output torque of the electric winch (NM), Kj is a safety factor (>1), Gg is the overall weight of the header part (N), and Lg is the length of the connecting rod (m). When the operation begins, the electric winch 105 adjusts the lower limit of the height of the header 104, and when the header 104 encounters complex terrain, the connecting rod 401 moves up and down along the ground with the header 104, so as to realize an effect of passive ground contour following operation.

The mechanical section allows the header 104 to be raised and lowered under the action of the electric winch 105. As hoisting is realized by using the rope, the rope limits only the lowest position of the header 104 during hoisting and does not limit the degree of freedom of upward movement of the header 104, so that the requirements of realizing longitudinal hoisting and enabling the header 104 to conduct ground contour following operation are met. Meanwhile, the lower base bearings 301 and the upper base bearings 403 cooperate to form a rotating pair, and by means of telescoping of the push rod motor 104, the adjustment of the cutting angle of the header 104 can be implemented on the mechanical structure.

Figure 8:
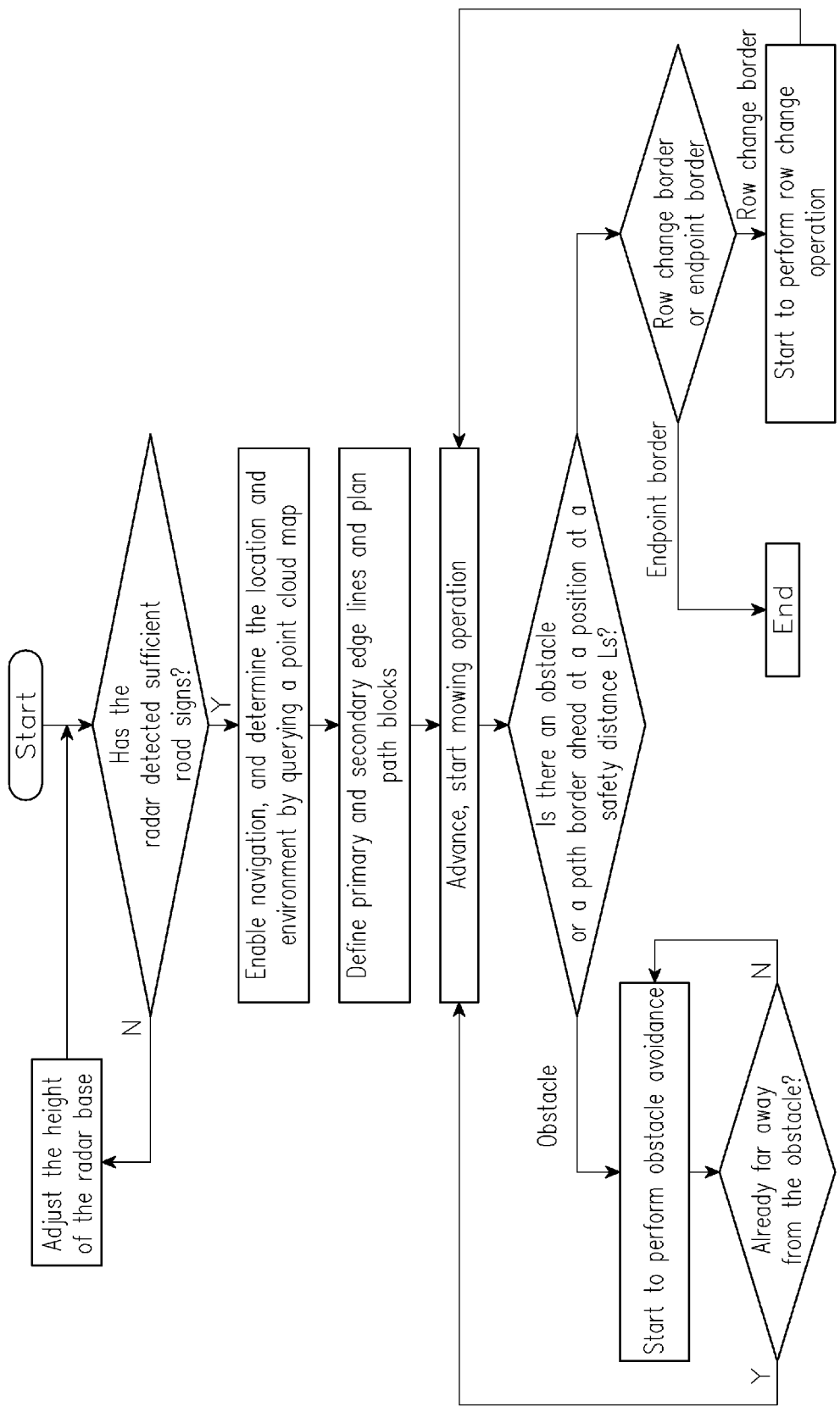
FIG. 8 is a flowchart of a method for controlling the ground-contour-following autonomous obstacle avoidance mower for hillside orchards according to the present invention.

As shown in FIG. 8, the control system includes a drive system and a detection main control system.

The drive system adopts two servo motors to respectively drive tracks on two sides of the tracked chassis 101 to operate. The drive system includes a servo motor, an encoder, a reducer, a chassis power supply and the chassis lower computer, driving of the tracked chassis 101 is realized by a closed-loop system in which the servo motor cooperates with the encoder and the reducer.

The servo motor and the reducer are mounted at a rear part of the tracked chassis. An output shaft of the servo motor is rigidly connected to an input bearing of the reducer. When the output shaft of the servo motor rotates, the reducer is driven to rotate. An output shaft of the reducer is rigidly connected to a center of a drive wheel of the tracked chassis. An edge of an output end of the reducer coincides with an inner edge of the tracked chassis. The encoder is mounted inside the servo motor. When starting to rotate, the servo motor drives the encoder to rotate, and the encoder transmits rotating speed information to the chassis lower computer. The chassis power supply adopts lithium batteries, and is mounted inside the chassis. The chassis power supply includes four lithium batteries, where each two of the four lithium batteries form one group, and the two groups are symmetrically arranged by using an axis of the tracked chassis in the advancing direction as a reference. The two groups of lithium batteries closely fit with an inner wall of the tracked chassis to prevent movement of the lithium batteries. The chassis lower computer is mounted in the center of the chassis, is powered by the chassis power supply, and is in signal connection with the servo motor and the encoder, so as to control the rotating speed of the servo motor and monitor the rotating speed of the servo motor in real time.

The servo motor adopts a trapezoid acceleration/deceleration and PID control algorithm. The acceleration in trapezoid acceleration/deceleration is set manually as required. The servo motor is selected based on the following formula:

$$P=UI, P=[a]*9550*M/n$$

where P is the motor power (W), U is the rated voltage of the motor (V), I is the current (A), M is the motor torque (N/m), n is the rotating speed of the motor (rad/s), and [a] is a safety factor ([a]>1).

The encoder is a photoelectric 16-bit quadrature encoder. In order to ensure timely signal feedback of the encoder, a lower controller of the chassis adopts a hardware timer, which measures the rotating speed of the servo motor periodically every 10 ms, and feeds back the rotating speed to the chassis lower computer, thereby achieving a closed-loop drive system.

The detection main control system includes the two-dimensional laser radar 102, a laser radar base, the navigation system, a radar-associated attitude sensor, a barometer, a 4G communication system, and an upper industrial computer. A 64-bit industrial computer with a main frequency of 2.8 GHz is used as the upper industrial computer, and the upper industrial computer is mounted inside the tracked chassis.

The laser radar base is connected to an upper surface of the tracked chassis by threads, the laser radar base is arranged at a front end of the tracked chassis, and the two-dimensional laser radar 102 is mounted at a top end of the laser radar base. The two-dimensional laser radar 102 transmits the obtained signal to the upper industrial computer for related calculation. The height of the laser radar base is adjusted by the push rod motor 103. When the two-dimensional laser radar 102 has not acquired sufficient road signs, the laser radar base is first retracted downward. When the laser radar base has reached a bottommost position but still no sufficient road signs have been found, the laser radar base is stretched to push the two-dimensional laser radar 102 to move upward, until a topmost position is reached. During the retraction or stretching process, once the two-dimensional laser radar 102 has found sufficient road signs, the laser radar base stops retraction or stretching. If no sufficient road signs are found after the retraction or stretching process is complete, road signs and a preset value for the number of road signs are redefined, and then the above actions are performed again.

The lowest height that the two-dimensional laser radar 102 can reach is higher than the height that the header 104 is at after being fully lifted up, so as to prevent the external environment from affecting the scanning of the two-dimensional laser radar 102.

The barometer and the radar-associated attitude sensor are mounted inside the two-dimensional laser radar 102. The radar-associated attitude sensor is a 100 Hz frequency attitude sensor, and communicates with the upper industrial computer via RS232. A plane where the radar-associated attitude sensor is mounted is parallel to a plane where the two-dimensional laser radar 102 is mounted. An axis of a yaw angle of the radar-associated attitude sensor is parallel to the retraction/stretching direction of the laser radar base, an axis of a roll angle of the radar-associated attitude sensor is parallel to a forward/backward direction of the vehicle section, and an axis of a pitch angle of the radar-associated attitude sensor is perpendicular to the forward/backward direction of the vehicle section.

The navigation system includes the positioning radar rack 502, the main radar antenna 501, and the secondary radar antenna 503. The navigation system is a 5 Hz Beidou positioning system, and can feed back in real time the actual geographic location of the point, and transmit the actual geographic location and the obtained heading direction information to the upper industrial computer via an RS232 interface.

A current attitude of the laser radar obtained by the radar-associated attitude sensor, an altitude of the laser radar obtained by the barometer, and ambient environment information of the current attitude obtained by the two-dimensional laser radar 102 are all transmitted to the upper industrial computer. The upper industrial computer combines the data obtained by the two-dimensional laser radar 102, the radar-associated attitude sensor and the barometer to obtain information about an absolute geographic location at this moment, sends the information about the absolute geographic location to a cloud server by using the 4G communication system, and by querying point cloud map information of the location and correcting the point cloud map information with reference to the data obtained by the two-dimensional laser radar 102, further determines information about the ambient environment.

The 4G communication system sends the returned information about the ambient environment to the upper industrial computer. The upper industrial computer masks all the point cloud data except data with labeled features, starts to extract the data with the labeled features, and determines according to the labeled features whether there is an obstacle ahead.

The tracked chassis adopts a two-level control system. A chassis lower computer having an ARM Cortex-M4 chip as the core is used as the chassis lower computer. The RS485 communication mode and MODBUS communication protocol are adopted between the chassis lower computer and the upper industrial computer. The chassis lower computer transmits the real-time status of the rotating speed of the servo motor to the upper industrial computer in real time, and the upper industrial computer sends an instruction to the chassis lower computer according to the information about the absolute geographic location at the moment, so as to drive the entire tracked chassis 101 to move.

As shown in FIG. 8, a method for controlling the ground-contour-following autonomous obstacle avoidance mower for hillside orchards includes the following steps: tracked chassis detection and control, header detection and control, path planning and operation planning.

(1) Tracked Chassis Detection and Control

Calibration of an advancing direction of the tracked chassis is realized by combining heading direction information from the navigation system with data from the radar-associated attitude sensor and the encoder inside the servo motor. Because the radar-associated attitude sensor is built inside the two-dimensional laser radar 102 and is distant from metal articles containing a lot of iron, there is no external soft magnetic environment interfering with the navigation angle of the two-dimensional laser radar 102. First, the encoder is used to measure the rotating speeds of the tracks on two sides in real time, and a predetermined rotating speed range is set for the servo motor. If the rotating speeds of the tracks on the two sides both reach the predetermined rotating speed range, the radar-associated attitude sensor starts to use a yaw angle to check the advancing direction of the tracked chassis; if yaw angle detection indicates that the yaw angle remains unchanged during advancing of the tracked chassis, the navigation system is used to re-measure whether there is a problem with a heading direction. The order of priorities of the three methods for calibrating the advancing direction of the tracked chassis is: measurement and feedback of encoder>feedback of radar-associated attitude sensor>heading direction detection of navigation system. Even if the navigation system has a signal problem and cannot receive any signal, the tracked chassis can continue to move forward by relying on the encoder and the radar-associated attitude sensor. When the tracked chassis 101 turns, the left chassis and the right chassis use the same rotating speed to turn, to ensure that the center of the turning radius is always located at the center of the tracked chassis 101 in the case of no slipping.

(2) Header Detection and Control

The header acceleration attitude sensor is configured to determine the overall roll angle of the header, so as to feed back the cutting angle of the cutter in real time, providing guidance for the adjustment of the cutting angle of the header. When the upper industrial computer sends a predetermined angle value to the header lower computer, the header lower computer compares an obtained current value of the overall roll angle of the header with the preset angle value for the header, and drives the corresponding attitude adjustment push rod motor 103 to telescope. This process will be repeated until the angle obtained by the header acceleration attitude sensor meets a required deviation range relative to the preset angle value, after which the attitude adjustment push rod motor 103 stops telescoping and performs self-locking. By using the header lower computer to drive the push rod motor 103, the cutting angle is changed. Meanwhile, the upper industrial computer sends a predetermined cutter rotating speed and an instruction of the electric winch 105 to the header lower computer, so that the header lower computer controls a cutter rotating angle and a height of the header 104.

The preset angle for the header is obtained from a database built based on plant densities and plant types. After the upper industrial computer sends the information about the ambient environment to the cloud server, the server queries and sends an optimal cutting angle and cutting rotating speed at this moment to the upper industrial computer. The upper industrial computer sends the cutting angle and cutting rotating speed to the header lower computer via RS485.

(3) Path Planning and Operation Planning

The two-dimensional laser radar 102 starts to scan the ambient environment to determine whether there are sufficient road signs. If the number of road signs detected is less than a preset value, the laser radar base starts to be retracted. After reaching a bottommost position, the laser radar base starts to be stretched. During the retraction or stretching, if the number of road signs detected is greater than or equal to the preset value, the laser radar base stops retraction or stretching, and a next step is performed. If the number of road signs detected is still less than the preset value after the above action is completed, the preset value is readjusted. After the adjustment of the height of the two-dimensional laser radar 102 is completed, the navigation system is started. After stable data is obtained, the two-dimensional laser radar 102 starts to operate. Meanwhile, data obtained by the two-dimensional laser radar 102, the barometer and the radar-associated attitude sensor are transmitted to the upper industrial computer. The upper industrial computer obtains an absolute geographic location of the two-dimensional laser radar 102 at this moment, transmits the absolute geographic location to the cloud server by using the 4G communication system, and by querying point cloud map information of the location and correcting the point cloud map information with reference to the data obtained by the two-dimensional laser radar 102, further determines information about the ambient environment.

The upper industrial computer starts to perform path planning for the ambient environment, compute marginal limits of the environment, for example, large-scale fault lines of environments such as cliffs and terraces, and determine the fault lines as edge lines. If there is no edge line on the left and right sides, primary and secondary edge lines are defined manually. If there is an edge line on only one of the left and right sides, the edge line is defined as the primary edge line, and a secondary edge line is defined manually on the other side. If there is an edge line on each of the left and right sides, the edge line on the side with lower altitude is defined as the primary edge line, and the edge line on the other side is defined as the secondary edge line. After the primary and secondary edge lines are defined, a maximum spacing between the primary and secondary edge lines is defined as a total width. The total width is divided by a mower width L. If the result contains a decimal, the result is rounded up to an integer, and path blocks are planned by using the integer as a criterion.

Figure 9:
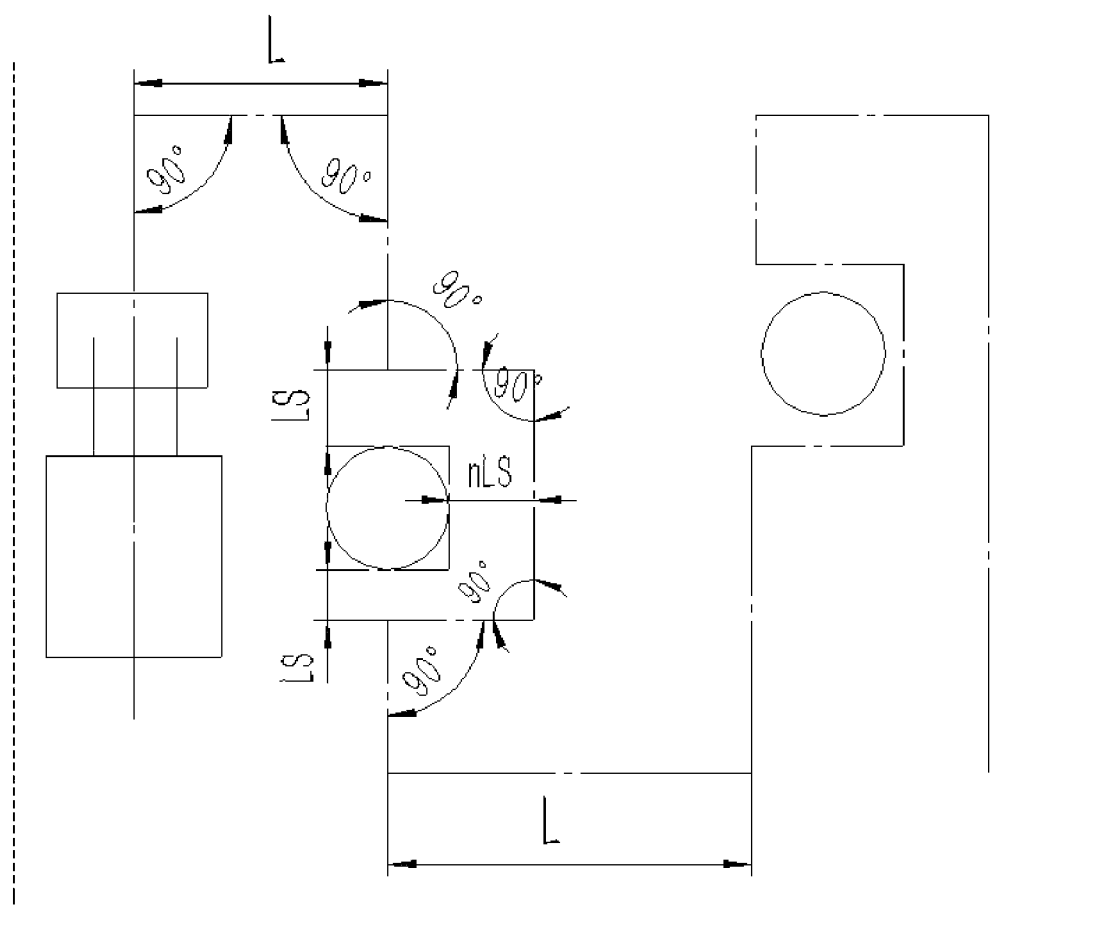
FIG. 9 is a schematic view showing path planning according to the present invention.

After a suitable path is planned, an advancing speed of the tracked chassis 101 and a cutting speed and an optimal cutting angle of the cutter are set based on local terrain. The mower performs mowing operation in parallel with side boundaries of the path blocks, and if there is an obstacle ahead at a position at a safety distance Ls, starts to perform obstacle avoidance. The obstacle avoidance is: if there is an obstacle ahead, turning at a position that is distant from the obstacle by Ls, and advancing by Ls after turning 90° toward the secondary edge line; if at this time the advancing path before the turning is already far away from the obstacle, turning, by the mower, 90° toward the primary edge line; or if at this time the advancing path before the turning is not far away from the obstacle, continuing to advance by Ls until the advancing path before the turning is far away from the obstacle, at which time the mower turns 90° toward the primary edge line, advances by Ls and then turns 90°, to return to the advancing path before the turning, wherein Ls is the safety distance and is set manually according to the operating environment, as shown in FIG. 9 (where the leftmost dashed line represents the primary edge line and the rightmost solid line represents the secondary edge line.

If there is a border ahead at a position at the safety distance Ls, an upper main control computer starts to calculate a number of path blocks that the mower has passed through, and compare the number of path blocks that the mower has passed through with a previously planned number of path blocks. If the number of path blocks that the mower has passed through is less than the previously planned total number of path blocks, it is determined that the border ahead is a row change border, so that when reaching a position distant from the border by Ls, the mower starts to turn 90° toward the right edge line, advances by L after the turning, and then turns 90° toward the left edge line, and advances to continue with the mowing operation. If the number of path blocks that the mower has passed through is greater than or equal to the previously planned total number of path blocks, it is determined that the border ahead is an endpoint border. In this case, the mower stops operation at the endpoint border, and returns to the origin location of operation.

During the advancing process, the mower advances along the previously planned path, and when it is found that there is a border ahead at a position at the safety distance Ls, the upper main control computer starts to calculate and compare a number of path blocks that the mower has passed through with the previously planned number of path blocks. If the number of path blocks that the mower has passed through is less than the previously planned total number of path blocks, it is determined that the border ahead is a turning border. In this case, when reaching a position distant from the border by Ls, the mower starts to turn 90° toward the right edge line, advances by L after the turning, then turns 90° toward the left edge line, and advances to continue with the mowing operation. If the number of path blocks that the mower has passed through is greater than or equal to the previously planned total number of path blocks, it is determined that the border ahead is an endpoint border. In this case, the mower stops operation at the endpoint border, and returns to the origin location of operation.

When the mowing operation begins, weeds are first propped up by the front depth-limiting-mechanism connecting plate 202. The purpose of this action is to reduce the minimum linear velocity required when the cutter rotates, thereby reducing the rotating speed and torque required by the cutter drive motor.

When the navigation system and the two-dimensional laser radar 102 determine through recognition and scanning that the working area has been cleared, the electric winch 105 starts to roll up, to raise the header 104 to a certain height. At this height, the scanning of the two-dimensional laser radar 102 is not blocked, and a sufficient height is provided for the maintenance of the cutter and other wearable parts.

When over 60% of the coverage area of the two-dimensional laser radar 102 at 10 cm is blocked, the cutter drive motor of the mower performs emergency braking, so as to ensure the safety of operators and protect the parts of the mower. After the mowing operation is completed, the tracked chassis 101 returns to the origin location of operation according to the data obtained by the two-dimensional laser radar 102. After the mower arrives at the origin location, all the motors stop operation, and are kept in a locked state, so as to prevent operators from being injured during inspection.

The embodiments are preferred embodiments of the present invention, but the present invention is not limited to the above-mentioned embodiments. Without departing from the spirit of the present invention, any obvious improvement, replacement or variation that can be made by the person skilled in the art belongs to the protection scope of the present invention.

What is claimed is:

1. A ground-contour-following autonomous obstacle avoidance mower for hillside orchards, comprising a mechanical section and a control system, wherein the mechanical section comprises a header and a tracked chassis, a winch support and a control box are arranged on a chassis body of the tracked chassis, a push-rod-motor rear connecting base in front of the winch support is connected to a rear end of a push rod motor, an electric winch is mounted in a middle of the winch support, and a two-dimensional laser radar is mounted at a top end of the winch support; a navigation system is further arranged on the chassis body of the tracked chassis; the header comprises buffer depth-limiting mechanisms, a front depth-limiting-mechanism connecting plate, a motor connecting plate, a header supporting plate and a rear depth-limiting-mechanism connecting plate, a front end of the front depth-limiting-mechanism connecting plate is connected to three of the buffer depth-limiting mechanisms, support frames are arranged on the front end of the front depth-limiting-mechanism connecting plate at positions not connected to the buffer depth-limiting mechanisms, a rear end of the front depth-limiting-mechanism connecting plate is sequentially connected to the motor connecting plate and the rear depth-limiting-mechanism connecting plate, an upper side of the motor connecting plate is connected to the header supporting plate, and an edge of a rear end of the rear depth-limiting-wheel-mechanism connecting plate is connected to two of the buffer depth-limiting mechanisms;

each of the buffer depth-limiting mechanisms comprises a mounting base, a buffer spring, a rotating pair connecting rod and a universal depth-limiting wheel, a lower side of the mounting base is connected to the front depth-limiting-mechanism connecting plate and the rear depth-limiting-mechanism connecting plate, two ends of the buffer spring are respectively connected to the rotating pair connecting rod and the mounting base, the rotating pair connecting rod is in a shape of a letter "J", a lower end of the rotating pair connecting rod is connected to the mounting base, and an outer side of the rotating pair connecting rod is connected to the universal depth-limiting wheel by a universal depth-limiting-wheel connecting bracket;

the control system comprises a drive system and a detection main control system, the drive system is configured to drive the tracked chassis to operate, the detection main control system comprises the two-dimensional laser radar, the navigation system, a radar-associated attitude sensor, a barometer, a 4G communication system, and an upper industrial computer, the two-dimensional laser radar, the navigation system, the radar-associated attitude sensor, and the barometer all communicate with the upper industrial computer, the barometer and the radar-associated attitude sensor are mounted inside the two-dimensional laser radar, and the 4G communication system is configured to enable communication between the upper industrial computer and a cloud server; and the upper industrial computer further performs signal transmission with a chassis lower computer and a header lower computer.

2. The ground-contour-following autonomous obstacle avoidance mower for the hillside orchards according to claim 1, wherein cutters are respectively mounted on two cutter drive motors on the motor connecting plate, and a header acceleration attitude sensor is further mounted on the motor connecting plate, to feed back a cutter angle to the header lower computer in real time.

3. The ground-contour-following autonomous obstacle avoidance mower for the hillside orchards according to claim 1, wherein an upper part of the header supporting plate is connected to a base bearing connecting plate, a lower base bearing is mounted on the base bearing connecting plate, and the lower base bearing is connected to the upper base bearing by a base-connecting unthreaded shaft; and a push-rod-motor front connecting base is arranged at a rear end of the base bearing connecting plate, and is configured to be connected to an extension end of the push rod motor.

4. The ground-contour-following autonomous obstacle avoidance mower for the hillside orchards according to claim 3, wherein the upper base bearing is mounted at a lower end of an upper connecting plate, a winch rope connecting base is arranged at a front end of the upper connecting plate and is configured to be connected to a rope hook of the electric winch, a connecting-rod connecting base is mounted on the upper connecting plate, the connecting-rod connecting base is fixedly connected to a front end of a connecting rod, a rear end of the connecting rod is connected to a connecting-rod rotating pair.

5. The ground-contour-following autonomous obstacle avoidance mower for the hillside orchards according to claim 1, wherein the drive system comprises a servo motor, an encoder, a reducer, a chassis power supply and the chassis lower computer, an output shaft of the servo motor is connected to an input bearing of the reducer, the encoder is mounted inside the servo motor, and the chassis lower computer is in signal connection with the servo motor and the encoder.

6. A method for controlling the ground-contour-following autonomous obstacle avoidance mower for the hillside orchards according to claim 1, wherein calibration of an advancing direction of the tracked chassis is realized by combining heading direction information from the navigation system with data from the radar-associated attitude sensor and an encoder inside a servo motor, the encoder measures rotating speeds of tracks on two sides in real time, and if the rotating speeds of the tracks on the two sides both reach a predetermined rotating speed range, the radar-associated attitude sensor starts to use a yaw angle to check the advancing direction of the tracked chassis; if yaw angle detection indicates that the yaw angle remains unchanged during advancing of the tracked chassis, the navigation system is used to re-measure whether there is a problem with a heading direction;

the header lower computer compares a current overall roll angle of the header with a preset angle value for the header, if the current overall roll angle of the header does not fall within a range of the preset angle value for the header, the header lower computer drives the push rod motor to telescope until the current overall roll angle of the header falls within a required deviation range relative to the preset angle value, so as to change a cutting angle, and at the same time, the header lower computer controls a cutter rotating angle and a height of the header;

according to a road sign in an ambient environment, the two-dimensional laser radar is adjusted to a suitable height, and the upper industrial computer determines information about the ambient environment by querying point cloud map information of the location of the two-dimensional laser radar corresponding to the suitable height, and starts to perform path planning for the ambient environment, determine edge lines, define primary and secondary edge lines, and plan path blocks; an advancing speed of the tracked chassis and a cutting speed and an optimal cutting angle of the cutter are set based on terrain; and the mower performs mowing operation, and if there is an obstacle ahead at a position at a safety distance, starts to perform right-angle obstacle avoidance, or if there is no obstacle and there is a border ahead at a position at the safety distance, stops operation or performs row change operation based on a type of the border.

7. The method for controlling the ground-contour-following autonomous obstacle avoidance mower for the hillside orchards according to claim 6, wherein the right-angle obstacle avoidance is: if there is an obstacle ahead, turning at a position that is distant from the obstacle by the safety distance, and advancing by the safety distance after turning 90° toward the secondary edge line; if at this time a distance from the advancing path to the obstacle before the turning is greater than the safety distance, turning, by the mower, 90° toward the primary edge line; or if at this time the distance from the advancing path to the obstacle before the turning is not greater than the safety distance, continuing to advance by the safety distance until the distance from the advancing path to the obstacle before the turning is greater than the safety distance, at which time the mower turns 90° toward the primary edge line, advances by the safety distance and then turns 90°, to return to the advancing path before the turning.

8. The method for controlling the ground-contour-following autonomous obstacle avoidance mower for the hillside orchards according to claim 6, wherein a process of determination based on the type of the border is as follows:

comparing, by an upper main control computer, a number of path blocks that the mower has passed through with a previously planned number of path blocks; and if the number of path blocks that the mower has passed through is less than the previously planned total number of path blocks, determining that the border ahead is a row change border, so that when reaching a position distant from the border by the safety distance, the mower turns 90° toward a right edge line, advances by a mower width after the turning, and then turns 90° toward a left edge line, and advances to continue with the mowing operation; or if the number of path blocks that the mower has passed through is greater than or equal to the previously planned total number of path blocks, determining that the border ahead is an endpoint border, so that when reaching the endpoint border, the mower stops operation.

9. A method for controlling the ground-contour-following autonomous obstacle avoidance mower for the hillside orchards according to claim 2, wherein calibration of an advancing direction of the tracked chassis is realized by combining heading direction information from the navigation system with data from the radar-associated attitude sensor and an encoder inside a servo motor, the encoder measures rotating speeds of tracks on two sides in real time, and if the rotating speeds of the tracks on the two sides both reach a predetermined rotating speed range, the radar-associated attitude sensor starts to use a yaw angle to check the advancing direction of the tracked chassis; if yaw angle detection indicates that the yaw angle remains unchanged during advancing of the tracked chassis, the navigation system is used to re-measure whether there is a problem with a heading direction;

the header lower computer compares a current overall roll angle of the header with a preset angle value for the header, if the current overall roll angle of the header does not fall within a range of the preset angle value for the header, the header lower computer drives the push rod motor to telescope until the current overall roll angle of the header falls within a required deviation range relative to the preset angle value, so as to change a cutting angle, and at the same time, the header lower computer controls a cutter rotating angle and a height of the header;

according to a road sign in an ambient environment, the two-dimensional laser radar is adjusted to a suitable height, and the upper industrial computer determines information about the ambient environment by querying point cloud map information of the location of the two-dimensional laser radar corresponding to the suitable height, and starts to perform path planning for the ambient environment, determine edge lines, define primary and secondary edge lines, and plan path blocks; an advancing speed of the tracked chassis and a cutting speed and an optimal cutting angle of the cutter are set based on terrain; and the mower performs mowing operation, and if there is an obstacle ahead at a position at a safety distance, starts to perform right-angle obstacle avoidance, or if there is no obstacle and there is a border ahead at a position at the safety distance, stops operation or performs row change operation based on a type of the border.

10. The method for controlling the ground-contour-following autonomous obstacle avoidance mower for the hillside orchards according to claim 9, wherein the right-angle obstacle avoidance is: if there is an obstacle ahead, turning at a position that is distant from the obstacle by the safety distance, and advancing by the safety distance after turning 90° toward the secondary edge line; if at this time a distance from the advancing path to the obstacle before the turning is greater than the safety distance, turning, by the mower, 90° toward the primary edge line; or if at this time the distance from the advancing path to the obstacle before the turning is not greater than the safety distance, continuing to advance by the safety distance until the distance from the advancing path to the obstacle before the turning is greater than the safety distance, at which time the mower turns 90° toward the primary edge line, advances by the safety distance and then turns 90°, to return to the advancing path before the turning.

11. The method for controlling the ground-contour-following autonomous obstacle avoidance mower for the hillside orchards according to claim 9, wherein a process of determination based on the type of the border is as follows:

comparing, by an upper main control computer, a number of path blocks that the mower has passed through with a previously planned number of path blocks; and if the number of path blocks that the mower has passed through is less than the previously planned total number of path blocks, determining that the border ahead is a row change border, so that when reaching a position distant from the border by the safety distance, the mower turns 90° toward a right edge line, advances by a mower width after the turning, and then turns 90° toward a left edge line, and advances to continue with the mowing operation; or if the number of path blocks that the mower has passed through is greater than or equal to the previously planned total number of path blocks, determining that the border ahead is an endpoint border, so that when reaching the endpoint border, the mower stops operation.

12. A method for controlling the ground-contour-following autonomous obstacle avoidance mower for the hillside orchards according to claim 3, wherein calibration of an advancing direction of the tracked chassis is realized by combining heading direction information from the navigation system with data from the radar-associated attitude sensor and an encoder inside a servo motor, the encoder measures rotating speeds of tracks on two sides in real time, and if the rotating speeds of the tracks on the two sides both reach a predetermined rotating speed range, the radar-associated attitude sensor starts to use a yaw angle to check the advancing direction of the tracked chassis; if yaw angle detection indicates that the yaw angle remains unchanged during advancing of the tracked chassis, the navigation system is used to re-measure whether there is a problem with a heading direction;

the header lower computer compares a current overall roll angle of the header with a preset angle value for the header, if the current overall roll angle of the header does not fall within a range of the preset angle value for the header, the header lower computer drives the push rod motor to telescope until the current overall roll angle of the header falls within a required deviation range relative to the preset angle value, so as to change a cutting angle, and at the same time, the header lower computer controls a cutter rotating angle and a height of the header;

according to a road sign in an ambient environment, the two-dimensional laser radar is adjusted to a suitable height, and the upper industrial computer determines information about the ambient environment by querying point cloud map information of the location of the two-dimensional laser radar corresponding to the suitable height, and starts to perform path planning for the ambient environment, determine edge lines, define primary and secondary edge lines, and plan path blocks; an advancing speed of the tracked chassis and a cutting speed and an optimal cutting angle of the cutter are set based on terrain; and the mower performs mowing operation, and if there is an obstacle ahead at a position at a safety distance, starts to perform right-angle obstacle avoidance, or if there is no obstacle and there is a border ahead at a position at the safety distance, stops operation or performs row change operation based on a type of the border.

13. The method for controlling the ground-contour-following autonomous obstacle avoidance mower for the hillside orchards according to claim 12, wherein the right-angle obstacle avoidance is: if there is an obstacle ahead, turning at a position that is distant from the obstacle by the safety distance, and advancing by the safety distance after turning 90° toward the secondary edge line; if at this time a distance from the advancing path to the obstacle before the turning is greater than the safety distance, turning, by the mower, 90° toward the primary edge line; or if at this time the distance from the advancing path to the obstacle before the turning is not greater than the safety distance, continuing to advance by the safety distance until the distance from the advancing path to the obstacle before the turning is greater than the safety distance, at which time the mower turns 90° toward the primary edge line, advances by the safety distance and then turns 90°, to return to the advancing path before the turning.

14. The method for controlling the ground-contour-following autonomous obstacle avoidance mower for the hillside orchards according to claim 12, wherein a process of determination based on the type of the border is as follows:

comparing, by an upper main control computer, a number of path blocks that the mower has passed through with a previously planned number of path blocks; and if the number of path blocks that the mower has passed through is less than the previously planned total number of path blocks, determining that the border ahead is a row change border, so that when reaching a position distant from the border by the safety distance, the mower turns 90° toward a right edge line, advances by a mower width after the turning, and then turns 90° toward a left edge line, and advances to continue with the mowing operation; or if the number of path blocks that the mower has passed through is greater than or equal to the previously planned total number of path blocks, determining that the border ahead is an endpoint border, so that when reaching the endpoint border, the mower stops operation.

15. A method for controlling the ground-contour-following autonomous obstacle avoidance mower for the hillside orchards according to claim 4, wherein calibration of an advancing direction of the tracked chassis is realized by combining heading direction information from the navigation system with data from the radar-associated attitude sensor and an encoder inside a servo motor, the encoder measures rotating speeds of tracks on two sides in real time, and if the rotating speeds of the tracks on the two sides both reach a predetermined rotating speed range, the radar-associated attitude sensor starts to use a yaw angle to check the advancing direction of the tracked chassis; if yaw angle detection indicates that the yaw angle remains unchanged during advancing of the tracked chassis, the navigation system is used to re-measure whether there is a problem with a heading direction;

the header lower computer compares a current overall roll angle of the header with a preset angle value for the header, if the current overall roll angle of the header does not fall within a range of the preset angle value for the header, the header lower computer drives the push rod motor to telescope until the current overall roll angle of the header falls within a required deviation range relative to the preset angle value, so as to change a cutting angle, and at the same time, the header lower computer controls a cutter rotating angle and a height of the header;

according to a road sign in an ambient environment, the two-dimensional laser radar is adjusted to a suitable height, and the upper industrial computer determines information about the ambient environment by querying point cloud map information of the location of the two-dimensional laser radar corresponding to the suitable height, and starts to perform path planning for the ambient environment, determine edge lines, define primary and secondary edge lines, and plan path blocks; an advancing speed of the tracked chassis and a cutting speed and an optimal cutting angle of the cutter are set based on terrain; and the mower performs mowing operation, and if there is an obstacle ahead at a position at a safety distance, starts to perform right-angle obstacle avoidance, or if there is no obstacle and there is a border ahead at a position at the safety distance, stops operation or performs row change operation based on a type of the border.

16. The method for controlling the ground-contour-following autonomous obstacle avoidance mower for the hillside orchards according to claim 15, wherein the right-angle obstacle avoidance is: if there is an obstacle ahead, turning at a position that is distant from the obstacle by the safety distance, and advancing by the safety distance after turning 90° toward the secondary edge line; if at this time a distance from the advancing path to the obstacle before the turning is greater than the safety distance, turning, by the mower, 90° toward the primary edge line; or if at this time the distance from the advancing path to the obstacle before the turning is not greater than the safety distance, continuing to advance by the safety distance until the distance from the advancing path to the obstacle before the turning is greater than the safety distance, at which time the mower turns 90° toward the primary edge line, advances by the safety distance and then turns 90°, to return to the advancing path before the turning.

17. The method for controlling the ground-contour-following autonomous obstacle avoidance mower for the hillside orchards according to claim 15, wherein a process of determination based on the type of the border is as follows:
comparing, by an upper main control computer, a number of path blocks that the mower has passed through with a previously planned number of path blocks; and if the number of path blocks that the mower has passed through is less than the previously planned total number of path blocks, determining that the border ahead is a row change border, so that when reaching a position distant from the border by the safety distance, the mower turns 90° toward a right edge line, advances by a mower width after the turning, and then turns 90° toward a left edge line, and advances to continue with the mowing operation; or if the number of path blocks that the mower has passed through is greater than or equal to the previously planned total number of path blocks, determining that the border ahead is an endpoint border, so that when reaching the endpoint border, the mower stops operation.

18. A method for controlling the ground-contour-following autonomous obstacle avoidance mower for the hillside orchards according to claim 5, wherein
calibration of an advancing direction of the tracked chassis is realized by combining heading direction information from the navigation system with data from the radar-associated attitude sensor and the encoder inside the servo motor, the encoder measures rotating speeds of tracks on two sides in real time, and if the rotating speeds of the tracks on the two sides both reach a predetermined rotating speed range, the radar-associated attitude sensor starts to use a yaw angle to check the advancing direction of the tracked chassis; if yaw angle detection indicates that the yaw angle remains unchanged during advancing of the tracked chassis, the navigation system is used to re-measure whether there is a problem with a heading direction;
the header lower computer compares a current overall roll angle of the header with a preset angle value for the header, if the current overall roll angle of the header does not fall within a range of the preset angle value for the header, the header lower computer drives the push rod motor to telescope until the current overall roll angle of the header falls within a required deviation range relative to the preset angle value, so as to change a cutting angle, and at the same time, the header lower computer controls a cutter rotating angle and a height of the header;
according to a road sign in an ambient environment, the two-dimensional laser radar is adjusted to a suitable height, and the upper industrial computer determines information about the ambient environment by querying point cloud map information of the location of the two-dimensional laser radar corresponding to the suitable height, and starts to perform path planning for the ambient environment, determine edge lines, define primary and secondary edge lines, and plan path blocks; an advancing speed of the tracked chassis and a cutting speed and an optimal cutting angle of the cutter are set based on terrain; and the mower performs mowing operation, and if there is an obstacle ahead at a position at a safety distance, starts to perform right-angle obstacle avoidance, or if there is no obstacle and there is a border ahead at a position at the safety distance, stops operation or performs row change operation based on a type of the border.

19. The method for controlling the ground-contour-following autonomous obstacle avoidance mower for the hillside orchards according to claim 18, wherein the right-angle obstacle avoidance is: if there is an obstacle ahead, turning at a position that is distant from the obstacle by the safety distance, and advancing by the safety distance after turning 90° toward a secondary edge line; if at this time a distance from the advancing path to the obstacle before the turning is greater than the safety distance, turning, by the mower, 90° toward a primary edge line; or if at this time the distance from the advancing path to the obstacle before the turning is not greater than the safety distance, continuing to advance by the safety distance until the distance from the advancing path to the obstacle before the turning is greater than the safety distance, at which time the mower turns 90° toward a primary edge line, advances by the safety distance and then turns 90°, to return to the advancing path before the turning.

20. The method for controlling the ground-contour-following autonomous obstacle avoidance mower for the hillside orchards according to claim 18, wherein a process of determination based on the type of the border is as follows:
comparing, by an upper main control computer, a number of path blocks that the mower has passed through with a previously planned number of path blocks; and if the number of path blocks that the mower has passed through is less than the previously planned total number of path blocks, determining that the border ahead is a row change border, so that when reaching a position distant from the border by the safety distance, the mower turns 90° toward a right edge line, advances by a mower width after the turning, and then turns 90° toward a left edge line, and advances to continue with the mowing operation; or if the number of path blocks that the mower has passed through is greater than or equal to the previously planned total number of path blocks, determining that the border ahead is an endpoint border, so that when reaching the endpoint border, the mower stops operation.

* * * * *